US011991465B2

(12) United States Patent
Suess et al.

(10) Patent No.: US 11,991,465 B2
(45) Date of Patent: May 21, 2024

(54) LOW POWER EVENT DRIVEN PIXELS WITH PASSIVE, DIFFERENTIAL DIFFERENCE DETECTION CIRCUITRY, AND RESET CONTROL CIRCUITS FOR THE SAME

(71) Applicant: OMNIVISION TECHNOLOGIES, INC., Santa Clara, CA (US)

(72) Inventors: Andreas Suess, San Jose, CA (US); Shoushun Chen, Shanghai (CN)

(73) Assignee: OmniVision Technologies, Inc., Santa Clara, CA (US)

( * ) Notice: Subject to any disclaimer, the term of this patent is extended or adjusted under 35 U.S.C. 154(b) by 6 days.

(21) Appl. No.: 17/815,526

(22) Filed: Jul. 27, 2022

(65) Prior Publication Data
US 2024/0040278 A1 Feb. 1, 2024

(51) Int. Cl.
*H04N 25/709* (2023.01)
*H04N 25/50* (2023.01)
*H04N 25/74* (2023.01)
*H04N 25/778* (2023.01)

(52) U.S. Cl.
CPC ........... *H04N 25/709* (2023.01); *H04N 25/50* (2023.01); *H04N 25/74* (2023.01); *H04N 25/778* (2023.01)

(58) Field of Classification Search
CPC ...... H04N 25/50; H04N 25/709; H04N 25/74; H04N 25/778
See application file for complete search history.

(56) References Cited

U.S. PATENT DOCUMENTS

| 6,476,864 | B1 | 11/2002 | Borg et al. |
| 7,719,583 | B1 | 5/2010 | Lee et al. |
| 8,610,615 | B2 | 12/2013 | Kawahito |
| 8,780,240 | B2 | 7/2014 | Posch et al. |
| 9,961,291 | B2 | 5/2018 | Chen |
| 11,212,457 | B2 | 12/2021 | Dai et al. |
| 11,240,454 | B2 | 2/2022 | Gao et al. |

(Continued)

OTHER PUBLICATIONS

Ranganathan et al., "Discrete-Time Parametric Amplification Based on a Three-Terminal MOS Varactor: Analysis and Experimental Results," IEEE Journal of Solid-State Circuits, vol. 38, No. 12, Dec. 2003, 7 pages.

(Continued)

*Primary Examiner* — Antoinette T Spinks
(74) *Attorney, Agent, or Firm* — Perkins Coie LLP

(57) ABSTRACT

Low power event driven pixels with passive, differential difference detection circuitry (and reset control circuits for the same) are disclosed herein. In one embodiment, an event driven pixel comprises a photosensor, a photocurrent-to-voltage converter, and a difference circuit. The difference circuit includes (a) a first circuit branch configured to sample a reference light level based on a voltage output by the photocurrent-to-voltage converter, and to output a first analog light level onto a first column line that is based on the reference light level; and (b) a second circuit branch configured to sample a light level based on the voltage, and to output a second analog light level onto a second column line that is based on the light level. A difference between the second analog light level and the first analog light level indicates whether the event driven pixel has detected an event in an external scene.

34 Claims, 5 Drawing Sheets

(56) References Cited

U.S. PATENT DOCUMENTS

| | | |
|---|---|---|
| 11,430,828 B2 | 8/2022 | Gao et al. |
| 11,729,534 B1 * | 8/2023 | Suess .................. H04N 25/709 |
| | | 348/302 |
| 2017/0353683 A1 | 12/2017 | Sakakibara et al. |
| 2021/0344867 A1 | 11/2021 | Gao et al. |
| 2022/0149864 A1 | 5/2022 | Prakash et al. |
| 2022/0201236 A1 | 6/2022 | Gao et al. |
| 2022/0239855 A1 | 7/2022 | Spiessens |
| 2022/0239858 A1 | 7/2022 | Dai et al. |
| 2022/0321811 A1 | 10/2022 | Myers et al. |

OTHER PUBLICATIONS

Suess et al., U.S. Appl. No. 17/875,240, filed Jul. 27, 2022, 61 pages.
Suess et al., U.S. Appl. No. 17/875,244, filed Jul. 27, 2022, 52 pages.
Wu et al., "In-Pixel Storage Techniques for CMOS Burst-Mode Ultra-High-Speed Imagers," Vrije Universiteit Brussel (VUB), Dept. of Electronics and Informatics (ETRO), Brussels, Belgium, 2017, p. 312-315.
Wu et al., "Analysis and Design of a CMOS Ultra-High-Speed Burst Mode Imager with In-Situ Storage Topology Featuring In-Pixel CDS Amplification," Department of Electronics and informatics (ETRO), Vrije Universiteit Brussel, 1050 Brussels, Belgium, Sep. 23, 2018, 17 pages.

* cited by examiner

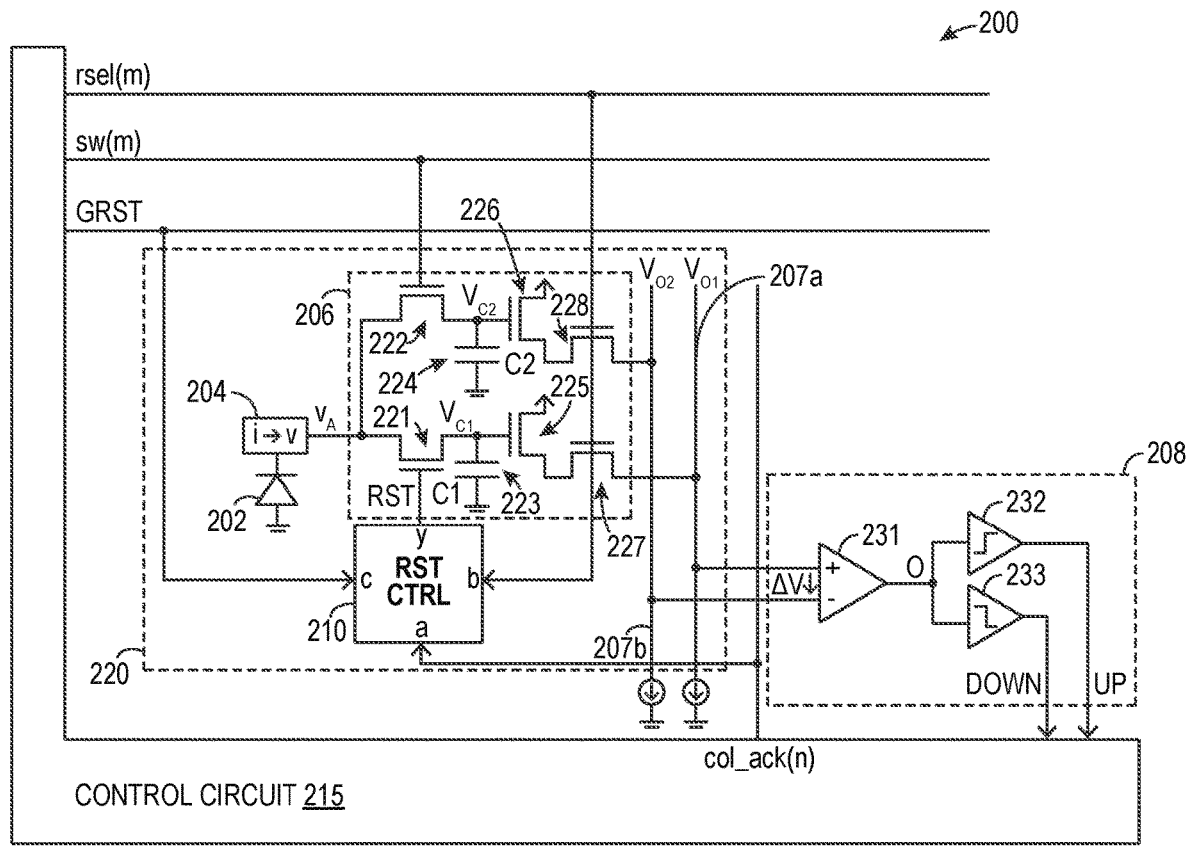
FIG. 2
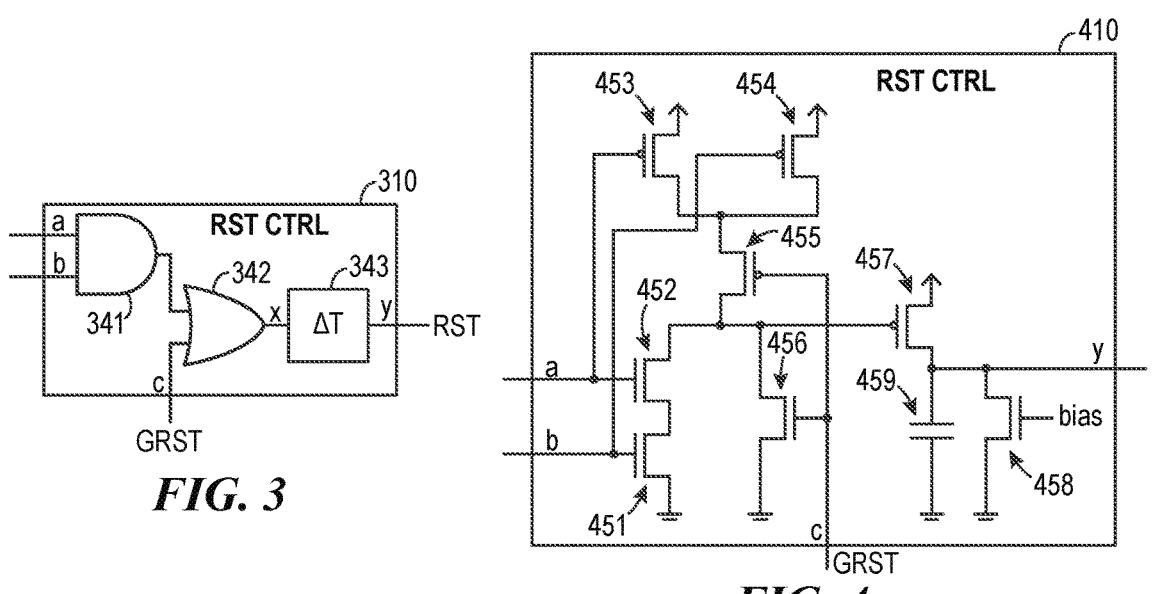
FIG. 3
FIG. 4

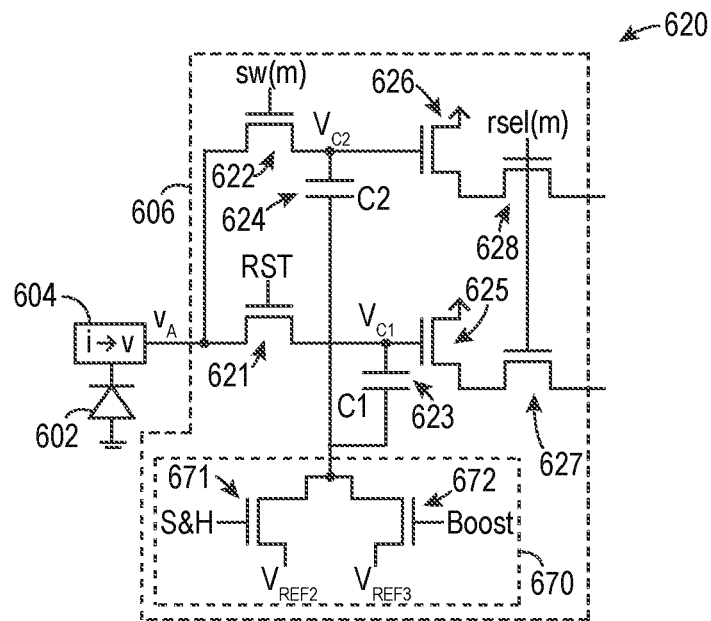
FIG. 6
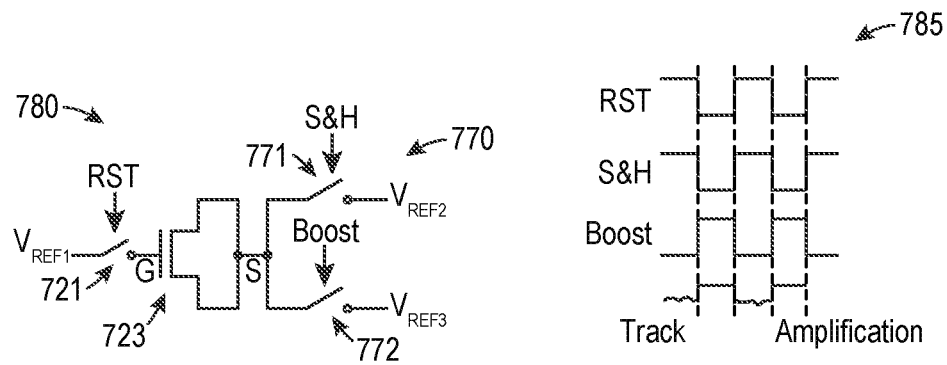
FIG. 7A  FIG. 7B
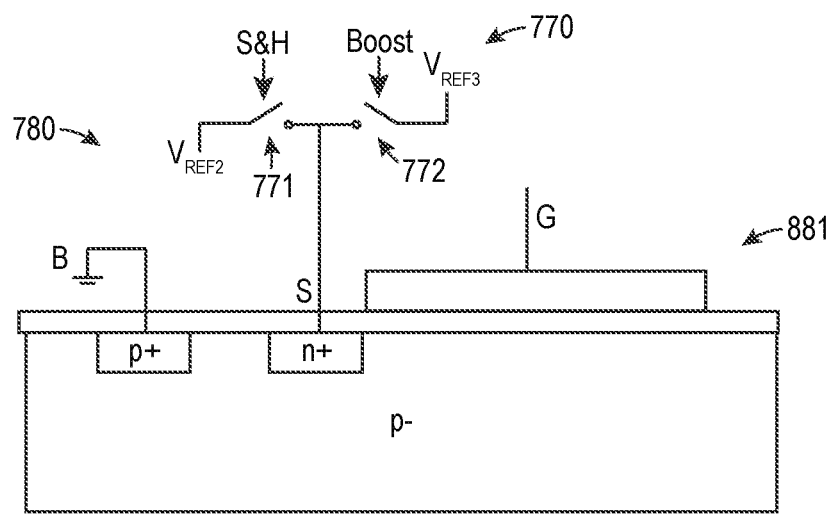
FIG. 8

LOW POWER EVENT DRIVEN PIXELS WITH PASSIVE, DIFFERENTIAL DIFFERENCE DETECTION CIRCUITRY, AND RESET CONTROL CIRCUITS FOR THE SAME

TECHNICAL FIELD

This disclosure relates generally to image sensors. For example, several embodiments of the present technology relate to event driven pixels, including low power event driven pixels with passive, differential difference detection circuitry, and reset control circuits for the same.

BACKGROUND

Image sensors have become ubiquitous and are now widely used in digital cameras, cellular phones, security cameras, as well as medical, automobile, and other applications. As image sensors are integrated into a broader range of electronic devices, it is desirable to enhance their functionality, performance metrics, and the like in as many ways as possible (e.g., resolution, power consumption, dynamic range, etc.) through both device architecture design as well as image acquisition processing.

A typical image sensor operates in response to image light from an external scene being incident upon the image sensor. The image sensor includes an array of pixels having photosensitive elements (e.g., photodiodes) that absorb a portion of the incident image light and generate image charge upon absorption of the image light. The image charge photogenerated by the pixels may be measured as analog output image signals on column bitlines that vary as a function of the incident image light. In other words, the amount of image charge generated is proportional to the intensity of the image light, which is read out as analog image signals from the column bitlines and converted to digital values to provide information that is representative of the external scene.

BRIEF DESCRIPTION OF THE DRAWINGS

Non-limiting and non-exhaustive embodiments of the present technology are described below with reference to the following figures, in which like or similar reference characters are used to refer to like or similar components throughout unless otherwise specified.

FIGS. 1 and 2 are partial schematic block diagrams of imaging systems including event driven pixels, each configured in accordance with various embodiments of the present technology.

FIGS. 3 and 4 are partial schematic diagrams of reset control circuits configured in accordance with various embodiments of the present technology.

FIG. 6 is a partial schematic diagram of another event driven pixel configured in accordance with various embodiments of the present technology.

FIG. 7A is a partial schematic diagram of a MOS varactor circuit configured in accordance with various embodiments of the present technology.

FIG. 7B is a timing diagram illustrating a method of operating the MOS varactor circuit of FIG. 7A in accordance with various embodiments of the present technology.

FIG. 8 is a partial schematic diagram of a three-terminal device that can be used in the MOS varactor circuit of FIG. 7A.

Figure 1:
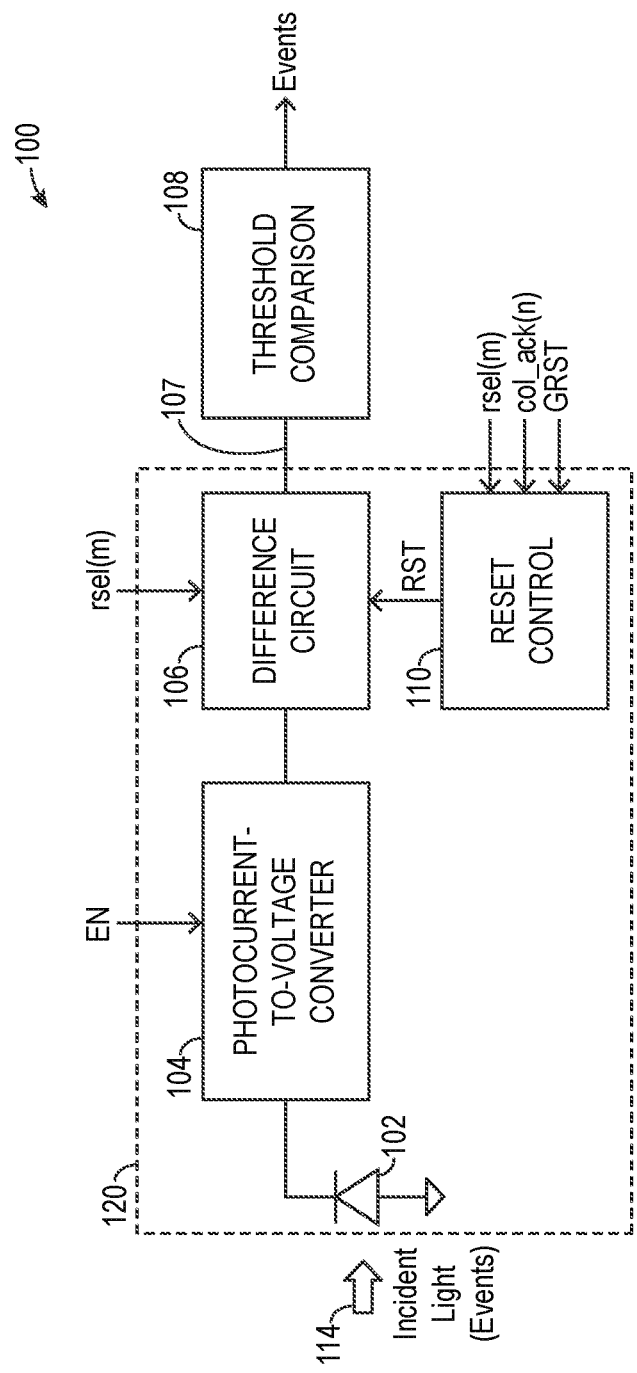

Skilled artisans will appreciate that elements in the figures are illustrated for simplicity and clarity and are not necessarily drawn to scale. For example, the dimensions of some of the elements in the figures may be exaggerated relative to other elements to aid in understanding of various aspects of the present technology. In addition, common but well-understood elements or methods that are useful or necessary in a commercially feasible embodiment are often not depicted in the figures or described in detail below to avoid unnecessarily obscuring the description of various aspects of the present technology.

DETAILED DESCRIPTION

The present disclosure relates to event driven sensors. For example, several embodiments of the present technology are directed to event driven pixels, including low power event driven pixels with passive, differential difference detection circuitry and/or to event driven pixels with reset control circuits. In the following description, specific details are set forth to provide a thorough understanding of aspects of the present technology. One skilled in the relevant art will recognize, however, that the systems, devices, and techniques described herein can be practiced without one or more of the specific details set forth herein, or with other methods, components, materials, etc.

Reference throughout this specification to an "example" or an "embodiment" means that a particular feature, structure, or characteristic described in connection with the example or embodiment is included in at least one example or embodiment of the present technology. Thus, use of the phrases "for example," "as an example," or "an embodiment" herein are not necessarily all referring to the same example or embodiment and are not necessarily limited to the specific example or embodiment discussed. Furthermore, features, structures, or characteristics of the present technology described herein may be combined in any suitable manner to provide further examples or embodiments of the present technology.

Spatially relative terms (e.g., "beneath," "below," "over," "under," "above," "upper," "top," "bottom," "left," "right," "center," "middle," and the like) may be used herein for ease of description to describe one element's or feature's relationship relative to one or more other elements or features as illustrated in the figures. It will be understood that the spatially relative terms are intended to encompass different orientations of a device or system in use or operation, in addition to the orientation depicted in the figures. For example, if a device or system illustrated in the figures is rotated, turned, or flipped about a horizontal axis, elements or features described as "below" or "beneath" or "under" one or more other elements or features may then be oriented "above" the one or more other elements or features. Thus, the exemplary terms "below" and "under" are non-limiting and can encompass both an orientation of above and below. The device or system may additionally, or alternatively, be otherwise oriented (e.g., rotated ninety degrees about a vertical axis, or at other orientations) that illustrated in the figures, and the spatially relative descriptors used herein are interpreted accordingly. In addition, it will also be understood that when an element is referred to as being "between" two other elements, it can be the only element between the two other elements, or one or more intervening elements may also be present.

Throughout this specification, several terms of art are used. These terms are to take on their ordinary meaning in the art from which they come, unless specifically defined herein or the context of their use would clearly suggest otherwise. It should be noted that element names and symbols may be used interchangeably through this document (e.g., Si vs. silicon); however, both have identical meaning.

A. Overview

An active pixel sensor commonly employs an array of pixels having an integration time that is globally defined. Thus, pixels in an array of an active pixel sensor typically have an identical integration time, and each pixel in the array is typically converted into a digital signal regardless of its content (e.g., regardless of whether there has been a change in an external scene that was captured by a pixel since the last time the pixel was read out).

In comparison, event driven sensors (e.g., event vision sensors or dynamic vision sensors) read out a pixel and/or convert a corresponding pixel signal into a digital signal only when the pixel captures a change (e.g., an event) in the external scene. In other words, pixels of an event driven sensor that do not detect a change in the external scene are not read out and/or pixel signals corresponding to such pixels are not converted into digital signals. Thus, each pixel of an event driven sensor can be independent from other pixels of the event driven sensor, and only pixels that detect a change in the external scene need be read out, and/or have their corresponding pixel signals converted into digital signals and/or recorded (thereby saving power).

Many event driven pixels include local amplification and comparators for event threshold detection. The amplification and comparator circuits of each event driven pixel typically require DC bias currents on the order of nano-amperes, resulting in milliwatts of power consumption in mega-pixel event driven sensors regardless of whether there are any events that occur in an external scene. In other words, the current power consumption of many event driven pixels make such event driven pixels unsuitable for use with battery-operated, always-on event driven sensors in which sub-milliwatt power consumption of the event driven sensors is desired (e.g., for prolonged battery life).

Some event driven pixels (a) measure, without amplification in the output stage, a voltage generated based on photocurrent output from a photosensor and (b) include a common-source gm-stage to make up for the lack of signal amplification in the output stage. Use of a common-source gm-stage is expected to lead to excessive non-uniformity, increased non-linearity, challenges in setting an operating point properly for all event driven pixels of an event driven sensor, and/or challenges in calibrating an event driven pixel. In addition, because signal amplification only occurs after the output stage, the noise performance of event driven pixels using a common-source gm-stage is expected to be inferior to the event driven sensors described above.

To address these concerns, several event driven pixels of the present technology each include (a) a photosensor configured to generate photocurrent in response to incident light received from an external scene, (b) a photocurrent-to-voltage converter coupled to the photosensor to convert the photocurrent to a voltage, and (c) a passive difference circuit coupled to the photocurrent-to-voltage converter and configured to generate a differential difference signal (e.g., complementary analog signal levels) based at least in part on the voltage. Use of passive difference circuits can reduce power consumption of the event driven pixels. In some embodiments, a passive difference circuit of the present technology can include separate and/or multiple sampling capacitors. In these and other embodiments, the difference circuit can include one or more source follower buffers or transistors. Including source follower buffers in the difference circuit is expected to (a) yield improved uniformity and/or linearity, and/or (b) improve the dynamic response of the event driven pixel, especially in comparison to event driven pixels that employ a common-source amplifier to re-introduce gain. In these and other embodiments, an event driven pixel of the present technology can include event threshold detection on a column level (a) to reduce static power consumption of the event driven pixel and/or (b) to implement frame-based readout of the event driven pixel.

In these and other embodiments, a photocurrent-to-voltage converter of the present technology can include an amplifier. The amplifier of the photocurrent-to-voltage converter can be employed to increase a response speed of a change of the voltage output from the photocurrent-to-voltage converter. In other words, the amplifier can be employed in low-latency applications to increase the speed with which the difference circuit of the event driven pixel produces the differential analog signal levels based on the voltage output from the photocurrent-to-voltage converter. In some embodiments, the amplifier of the photocurrent-to-voltage converter can be configured to receive an enable signal to selectively enable (or disable) the amplifier for power savings. For example, the amplifier of the photocurrent-to-voltage converter can be powered down at times when the event driven pixel is not outputting the differential analog signal levels (e.g., when a frame is not being read out), thereby reducing the power consumption of the event driven pixel.

In these and still other embodiments, event driven pixels of the present technology include a reset control circuit. The reset control circuit can be configured to (a) initialize the event driven pixel in response to assertion of a global reset signal and/or (b) reset the event driven pixel when a differential difference signal is read out from the event driven pixel (e.g., in response to assertion of a row select signal) and complementary analog signal levels of the differential difference signal indicate an event has occurred within an external scene (e.g., resulting in assertion of an acknowledge signal). Therefore, event driven pixels of the present technology are expected to be suitable in use with battery-operated, always-on event driven sensors while avoiding several of the challenges discussed above and observed in many event driven pixels.

B. Selected Embodiments of Low Power Event Driven Pixels, Reset Control Circuits, and Associated Systems, Devices, and Methods FIG. 1 is a partial schematic block diagram of an imaging system 100 configured in accordance with various embodiments of the present technology. As shown, the imaging system 100 includes an event driven pixel 120 and a threshold comparison circuit 108. The threshold comparison circuit 108 can be incorporated into the event driven pixel 120 in other embodiments of the present technology.

The event driven pixel 120 of FIG. 1 includes a photosensor 102, a photocurrent-to-voltage converter 104, a difference circuit 106, and a reset control circuit 110. The photosensor 102 is illustrated as a photodiode in FIG. 1 having an anode coupled to ground (e.g., a negative power supply rail or another reference voltage) and a cathode coupled to the photocurrent-to-voltage converter 104. In operation, the photosensor 102 of FIG. 1 is configured to photogenerate charge or photocurrent in response to incident light 114 received from an external scene. In other embodiments of the present technology, the photosensor 102 may be another suitable type of photosensor or photodetector (e.g., a metal-semiconductor-metal (MSM) photodetector, a phototransistor, a photoconductive detector, or a phototube).

The photocurrent-to-voltage converter 104 of FIG. 1 is coupled to the photosensor 102 and is configured to convert photocurrent generated by the photosensor 102 to a voltage. The difference circuit 106 is coupled to the photocurrent-to-voltage converter 104. Based on a voltage received from the photocurrent-to-voltage converter 104, the difference circuit 106 is configured to (a) sample a reference signal, light level, or voltage when the event driven pixel 120 is reset and (b) generate a differential difference signal (e.g., by sampling a signal, light level, or voltage for readout with the reference signal). When a row select signal rsel(m) is asserted, the difference circuit 106 can output the differential difference signal onto bit or column lines 107. More specifically, the difference circuit 106 can output complementary analog voltage signals of the differential difference signal to inputs of the threshold comparison circuit 108 via the column lines 107. The complementary analog voltage signals can correspond to the sampled reference signal and the sampled signal discussed above.

In some embodiments, the photocurrent-to-voltage converter 104 can be configured to receive an enable signal EN. As discussed in greater detail below with reference to FIGS. 11 and 12, the enable signal EN can be used to selectively enable (e.g., power up, such as turn on, enable current flow, or force into a higher power mode or state) or disable (e.g., power down, such as shut off, disable current flow, or force into a lower power mode or state) one or more amplifiers of the photocurrent-to-voltage converter 104. Disabling the amplifiers is expected to reduce power consumption of the event driven pixel 120, thereby reducing power consumption of the imaging system 100 and/or an image sensor (not shown) incorporating the imaging system 100.

The reset control circuit 110 controls reset of the event driven pixel 120. More specifically, the reset control circuit 110 receives a global reset signal GRST, the row select signal rsel(m), and an acknowledge signal col_ack(n). As discussed in greater detail below with reference to FIGS. 2-6, the reset control circuit is configured, based on assertion of the global reset signal GRST, the row select signal rsel(m), and/or the acknowledge signal col_ack(n), to (a) generate a reset signal RST and (b) initiate sampling of a new reference signal in the difference circuit 106 in response to assertion of the reset signal RST.

The threshold comparison circuit 108 is coupled to outputs of the difference circuit 106. In the illustrated embodiment, the threshold comparison circuit 108 is a circuit peripheral to the event driven pixel 120 and is coupled to the event driven pixel 120 via the column lines 107. Placement of the threshold comparison circuit 108 on the column lines 107 such that the threshold comparison circuit 108 is shared amongst the event driven pixel 120 and other event driven pixels (not shown) coupled to the column lines 107 is expected to reduce static power consumption in comparison to event driven pixels incorporating dedicated threshold comparison circuits.

In operation, the threshold comparison circuit 108 is configured to detect events that occur within the external scene. More specifically, when an event occurs in the external scene, the event is indicated in the incident light 114 that is received by the photosensor 102 as a quick or sudden change in intensity or brightness. In other words, if the external scene is static such that no event is occurring, the brightness of the incident light 114 remains substantially unchanged. As such, the photocurrent generated by the photosensor 102 remains substantially constant. If, however, an event (e.g., movement) occurs within the external scene, the event is indicated with an asynchronous quick or sudden change in the brightness of the incident light 114 received by the photosensor 102. The change in brightness can be from darker to brighter or from brighter to darker. Thus, there can be an asynchronous change in the photocurrent generated by the photosensor 102 that, in turn, can result in a change in the differential difference signal generated by the difference circuit 106. Therefore, the threshold comparison circuit 108 can be configured to receive a differential difference signal from the difference circuit 106 in the form of complementary analog voltage levels, determine a difference between the complementary analog voltage levels, compare the difference to one or more thresholds, and detect events that occur in the external scene based on the comparison(s). For example, the threshold comparison circuit 108 can detect that an event has occurred in the external scene when a magnitude of a difference between the complementary analog voltage levels output by the difference circuit 106 exceeds a magnitude of a threshold value.

When the threshold comparison circuit 108 detects an event, the acknowledge signal col_ack(n) can be asserted to prompt the reset control circuit 110 to (a) assert the reset signal RST to reset the event driven pixel 120 and (b) initiate sampling of a new reference voltage in the difference circuit 106. Additionally, or alternatively, the threshold comparison circuit 108 can output event information (e.g., where an event is detected, such as the x-y coordinates of the photosensor 102 in a pixel array used to detect the event; the polarity of change in the photocurrent for that event (e.g., brighter or darker); and/or a time the event occurred) for recording. On the other hand, when the threshold comparison circuit 108 does not detect an event, the acknowledge signal col_ack(n) can be left unasserted such that (absent assertion of the global reset signal GRST) the event driven pixel 120 is not reset by the reset control circuit 110, and the difference circuit 106 continues to generate a differential difference signal based on the formerly sampled reference voltage (e.g., the difference circuit 106 retains the formerly sampled reference signal).

It is noted that an image sensor incorporating the imaging system 100 of FIG. 1 does not need to record an entire regular image, and therefore is not burdened with having to capture all of the highly redundant information of a normal image from frame to frame. Instead, the image sensor can record only event information. In other words, outside of threshold comparison performed by threshold comparison circuit 108, the image sensor can ignore portions of frames of images or videos in which no event was detected, thereby enabling ultra-high frame rates and/or ultra-high-speed capabilities with a low data rate. In some embodiments, an event may be read out synchronously or asynchronously. In these and other embodiments, event data from the event driven pixel 120 may be combined with a normal image or video capture to reconstruct a high-frame-rate, high-quality image or video with event detection via software, an artificial intelligence (AI) network, or other suitable technology.

FIG. 2 is a partial schematic diagram of an imaging system 200 configured in accordance with various embodiments of the present technology. The imaging system 200 can be the imaging system 100 of FIG. 1 or another imaging system of the present technology. As shown, the imaging system 200 includes a control circuit 215, an event driven pixel 220, and a threshold comparison circuit 208.

The event driven pixel 220 includes a photosensor 202, a photocurrent-to-voltage converter 204, a difference circuit 206, and a reset control circuit 210. The photosensor 202 includes an anode coupled to ground (e.g., a negative power supply rail or another reference voltage) and a cathode. The photocurrent-to-voltage converter 204 of the event driven pixel 220 is coupled to the cathode of the photosensor 202 and is configured to convert photocurrent generated by the photosensor 202 to a voltage $V_A$. In some embodiments, the voltage $V_A$ has a logarithmic relation with the intensity of incident light received by the photosensor 202 from an external scene. Several schematic configurations of the photocurrent-to-voltage converter 204 are discussed in greater detail below with reference to FIGS. 9-12.

The difference circuit 206 of the event driven pixel 220 includes two branches, each coupled to the output of the photocurrent-to-voltage converter 204. A first branch of the difference circuit 206 includes a first transistor 221, a first capacitor 223 having a first capacitance C1, a first source follower buffer or transistor 225, and a first row select transistor 227. A second branch of the difference circuit 206 includes a second transistor 222, a second capacitor 224 having a second capacitance C2, a second source follower buffer or transistor 226, and a second row select transistor 228. In some embodiments, the first source follower transistor 225 and/or the second source follower transistor 226 is a/are a linear source follower transistor(s).

Referring to the first branch, the first transistor 221 includes (a) a drain coupled to an output of the photocurrent-to-voltage converter 204 and to a drain of the second transistor 222 of the second branch; (b) a source coupled to the first capacitor 223 and to a gate of the first source follower transistor 225; and (c) a gate coupled to an output of the reset control circuit 210 to receive a reset signal RST. The first capacitor 223 is coupled between (a) the source of the first transistor 221 and the gate of the first source follower transistor 225 and (b) ground (e.g., a negative power supply rail or another reference voltage). A drain of the first source follower transistor 225 is coupled to a supply voltage (e.g., a positive power supply rail or another reference voltage), and a source of the first source follower transistor 225 is coupled to a drain of the first row select transistor 227. The first row select transistor 227 includes (a) a source coupled to a first column line 207a and (b) a gate configured to receive a row select signal rsel(m). As discussed in greater detail below, the first branch is configured to sample a reference light level $V_{C1}$ on the first capacitor 223 based at least in part on the voltage $V_A$, and to output an analog voltage signal $V_{O1}$ onto the first column line 207a that corresponds to the reference light level $V_{C1}$.

Referring to the second branch, the drain of the second transistor 222 is coupled to the output of the photocurrent-to-voltage converter 204 and to the drain of the first transistor 221 of the first branch. The second transistor 222 further includes (a) a source coupled to the second capacitor 224 and to a gate of the second source follower transistor 226; and (b) a gate configured to receive a switch signal sw(m). The second capacitor 224 is coupled between (a) the source of the second transistor 222 and the gate of the second source follower transistor 226 and (b) ground (e.g., a negative power supply rail or another reference voltage). A drain of the second source follower transistor 226 is coupled to a supply voltage (e.g., a positive power supply rail or another reference voltage), and a source of the second source follower transistor 226 is coupled to a drain of the second row select transistor 228. The second row select transistor 228 includes (a) a source coupled to a second column line 207b and (b) a gate configured to receive the row select signal rsel(m). As discussed in greater detail below, the second branch is configured to sample a light level VC2 on the second capacitor 224 based at least in part on the voltage VA, and to output an analog voltage signal VO2 onto the second column line 207b that corresponds to the light level VC2.

In some embodiments, the switch signal sw(m) can be distributed to all or a subset (e.g., multiple ones, only one) of the event driven pixels of a row. For example, the switch signal sw(m) can be distributed to a plurality of event driven pixels of a row to minimize pixel transistor count. Alternatively, the switch signal sw(m) can be dedicated to a single event driven pixel 220 of the imaging system 200.

In some embodiments, the difference circuit 206 can be coupled to the photocurrent-to-voltage converter 204 such that the difference circuit 206 and/or the photocurrent-to-voltage converter 204 function as a high pass filter that is configured to filter out lower frequency components from the output of photosensor 202 and/or the photocurrent-to-voltage converter 204. Thus, the event driven pixel 220 can ignore slow or gradual changes in the photocurrent generated by the photosensor 202 in response to incident light from an external scene, and can instead detect quick or sudden changes that occur in the photocurrent generated by the photosensor 202 in response to the incident light.

Based on a voltage $V_A$ output from the photocurrent-to-voltage converter 204, the difference circuit 206 can generate voltages $V_{C1}$ and $V_{C2}$ that are each applied to the gate of the first source follower transistor 225 and to the gate of the second source follower transistor 226, respectively. In turn, the first source follower transistor 225 can output a first analog signal level to the first row select transistor 227 that is based on the voltage $V_{C1}$, and the second source follower transistor 226 can output a second analog signal level to the second row select transistor 228 that is based on the voltage $V_{C2}$. When the row select signal rsel(m) is asserted by the control circuit 215, the first row select transistor 227 can output the first analog signal level (shown as voltage $V_{O1}$ in FIG. 2) onto the first column line 207a, and the second row select transistor 228 can output the second analog signal level (shown as voltage $V_{O2}$ in FIG. 2) onto the second column line 207b. As discussed in greater detail below, the first analog signal level and the second analog signal level can be complementary signals of a differential signal indicative of whether an event has occurred in an external scene. In this manner, based at least in part on the voltage $V_A$ output from the photocurrent-to-voltage converter 204, the difference circuit 206 can output complementary signals of a differential difference signal onto the first and second column lines 207a and 207b when the control circuit 215 asserts the row select signal rsel(m) applied to the gates of the first and second row select transistors 227 and 228. In addition, because the first and second capacitors 223 and 224 are passive components and because the first and second transistors 221 and 222 are configured to function as switches, the difference circuit 206 consumes a small amount of power in comparison to difference circuits employing active circuit components, making the difference circuit 206 suitable for use in low power, battery-operated, and/or always-on event driven sensors. The difference circuit 206 can therefore be considered a low-power, passive, differential difference detection circuit.

The complementary analog voltage signals $V_{O1}$ and $V_{O2}$ of a differential difference signal output from the event driven pixel 220 onto the first and second column lines 207a and 207b are fed into the threshold comparison circuit 208. As shown, the threshold comparison circuit 208 includes an amplifier 231, a first comparator 232, and a second comparator 233. In some embodiments, the amplifier 231 can be an analog difference amplifier or a differential analog-to-digital converter (ADC), such as a ramp-type differential ADC. The amplifier 231 includes a positive input couple to the first column line 207a, a negative input coupled to the second column line 207b, and an output coupled to (i) an input of the first comparator 232 and (ii) an input of the second comparator 233. The first comparator 232 is configured to compare the output of the amplifier 231 to a first threshold, and the second comparator 233 is configured to compare the output of the amplifier 231 to a second threshold. In some embodiments, the first comparator 232 may be triggered when the brightness or intensity of light incident on the photosensor 202 of the event driven pixel 220 changes in one direction (e.g., from darker to brighter). When triggered, the first comparator 232 can assert a signal UP that can indicate that an event has occurred in an external scene. In these and other embodiments, the second comparator 233 may be triggered when the brightness or intensity of light incident on the photosensor 202 changes in the other direction (e.g., from brighter to darker). When triggered, the second comparator 233 can assert a signal DOWN that can indicate that an event has occurred in the external scene. The signals UP and DOWN are passed to the control circuit 215, and the control circuit 215 can assert an acknowledge signal col_ack(n) when the signal UP or the signal DOWN indicate that an event has occurred in the external scene (e.g., when the signal UP or the signal DOWN is asserted).

Referring again to the event driven pixel 220 of FIG. 2, the reset control circuit 210 includes a first input (input a) configured to receive the row select signal rsel(m), a second input (input b) configured to receive the acknowledge signal col_ack(n), and a third input (input c) configured to receive a global reset signal GRST. The reset control circuit 210 additionally includes an output (output y) configured to apply the reset signal RST to the gate of the first transistor 221 of the difference circuit 206. Assertion of the reset signal RST can depend, at least in part, on the states of the row select signal rsel(m), the acknowledge signal col_ack(n), and the global reset signal GRST received from the control circuit 215 and input into the reset control circuit 210. For example, as discussed in greater detail below, the control circuit 215 can assert the row select signal rsel(m) to readout complementary signals of a differential difference signal from the difference circuit 206, and can assert the acknowledge signal col_ack(n) when the threshold comparison circuit 208 detects an event has occurred in the external scene based on the differential difference signal. Continuing with this example, the reset control circuit 210 can assert the reset signal RST when the row select signal rsel(m) and the acknowledge signal col_ack(n) are asserted at the same time. As another example, the control circuit 215 can assert the global reset signal GRST to reset or initialize the event driven pixel 220, and the reset control circuit 210 can assert the reset signal RST in response to assertion of the global reset signal GRST.

FIGS. 3 and 4 are partial schematic diagrams of reset control circuits 310 and 410, respectively, that can be implemented as the reset control circuit 210 of FIG. 2 in various embodiments of the present technology. Referring first to FIG. 3, the reset control circuit 310 includes an AND logic gate 341, an OR logic gate 342, and a delay element 343. The AND logic gate 341 includes a first input configured to receive the row select signal rsel(m) via the first input (input a) of the reset control circuit 310, and a second input configured to receive the acknowledge signal col_ack (n) via the second input (input b) of the reset control circuit 310. The OR logic gate 342 includes a first input coupled to an output of the AND logic gate 341, a second input configured to receive the global reset signal GRST via the third input (input c) of the reset control circuit 310, and an output (output x) coupled to an input of the delay element 343. The delay element 343 includes an output coupled to the output (output y) of the reset control circuit 310.

In operation, the reset control circuit 310 is configured to assert the reset signal RST when (a) the global reset signal GRST is asserted or (b) the row select signal rsel(m) and the acknowledge signal col_ack(n) are asserted together. In other words, the reset control circuit 310 is configured to assert the RST whenever (a) the global reset signal GRST is asserted or (b) a difference signal is readout from the difference circuit 206 of the event driven pixel 220 of FIG. 2 and the difference signal indicates that an event has occurred in the external scene. Otherwise, the reset control circuit 310 outputs the reset signal RST in its unasserted state. As discussed in greater detail below, upon a falling edge of the output (output x) of the OR logic gate 342, the delay element 343 is configured to hold the reset signal RST in an asserted state for a refractory period. In other embodiments, the reset control circuit 310 can lack or omit the delay element (e.g., such that the output (output x) of the OR logic gate 342 is connected (e.g., directly) to the output (output y) of the reset control circuit 310, and/or such that the reset signal RST is deasserted upon the falling edge of the output (output x) of the OR logic gate 342 without a refractory period).

Referring now to FIG. 4, the reset control circuit 410 includes a plurality of transistors (identified individually in FIG. 4 as first through eight transistors 451-458) and a capacitor 459. The first through fourth transistor 451-454 are arranged as a NAND logic gate. More specifically, a source of the first transistor 451 is coupled to ground (e.g., a negative power supply rail or another reference voltage), a drain of the first transistor 451 is coupled to a source of the second transistor 452, and a gate of the first transistor 451 is configured to receive the acknowledge signal col_ack(n) via the second input (input b) of the reset control circuit 410. A drain of the second transistor 452 is coupled to a drain of the third transistor 453 and to a drain of the fourth transistor 454, and a gate of the second transistor 452 is configured to receive the row select signal rsel(m) via the first input (input a) of the reset control circuit 410. A source of the third transistor 453 is coupled to a supply voltage (e.g., a positive power supply rail or another reference voltage), the drain of the third transistor 453 is coupled to the drain of the fourth transistor 454, and a gate of the third transistor 453 is configured to receive the row select signal rsel(m) via the first input (input a) of the reset control circuit 410. A source of the fourth transistor 454 is coupled to the supply voltage, and a gate of the fourth transistor 454 is configured to receive the acknowledge signal col_ack(n) via the second input (input b) of the reset control circuit 410.

The seventh transistor 457 of the reset control circuit 410 is arranged as a low-active switch charging the capacitor 459. In particular, a source of the seventh transistor 457 is coupled to the supply voltage, a gate of the seventh transistor 457 is coupled to an output of the NAND logic gate (e.g., to drain of the second transistor 452, to the drain of the third transistor 453, and to the drain of the fourth transistor 454), and a drain of the seventh transistor 457 is coupled to the capacitor 459 and to the output (output y) of the reset control circuit 410. The capacitor 459 is coupled between (a) ground and (b) the drain of the seventh transistor 457 and the output (output y) of the reset control circuit 410.

The fifth transistor 455 and the sixth transistor 456 of the reset control circuit 410 are arranged as pass transistors. More specifically, (a) a source of the fifth transistor 455 is coupled to the drain of the third transistor 453 and to the drain of the fourth transistor 454; (b) a drain of the fifth transistor 455 is coupled to the drain of the second transistor 452 and to the gate of the seventh transistor 457; (c) a source of the sixth transistor 456 is coupled to ground; and (d) a drain of the sixth transistor 456 is coupled to the drain of the second transistor 452, to the drain of the fifth transistor 455, and to the gate of seventh transistor 457. A gate of the fifth transistor 455 and a gate of the sixth transistor 456 are each configured to receive the global reset signal via the third input (input c) of the reset control circuit 410.

The eighth transistor 458 is arranged as a resistive element configured to discharge the capacitor 459 when the low-active switch is released (e.g., when the seventh transistor 457 is turned off). More specifically, a source of the eighth transistor 458 is coupled to ground; a drain of the eighth transistor 458 is coupled to the drain of the seventh transistor 457, to the capacitor 459, and to the output (output y) of the reset control circuit 410; and a gate of the eighth transistor 458 is configured to receive a programmable or trimmable bias voltage. As discussed in greater detail below, the eighth transistor 458 is configured to hold the reset signal RST in an asserted state for a refractory period when the seventh transistor 457 is turned from on to off.

In operation, the reset control circuit 410 functions similar to the reset control circuit 310. In particular, when both the row select signal rsel(m) and the acknowledge signal col_ack(n) are asserted, the seventh transistor 457 is turned on via the output of the NAND logic gate (formed by the first through fourth transistors 451-454), the capacitor 459 is charged, and the reset signal RST output from the reset control circuit 410 is asserted. In addition, when the global reset signal GRST is asserted, the seventh transistor 457 is turned on via the sixth transistor 456 acting as a pass transistor, the capacitor 459 is charged, and the reset signal RST output from the reset control circuit 410 is asserted. At all other times, the seventh transistor 457 is off, the capacitor 459 is discharged or left uncharged, and the reset signal RST output from the reset control circuit 410 is not asserted.

The capacitor 459 of the reset control circuit 410 is discharged via the eighth transistor 458 when (a) the global reset signal is deasserted after being asserted or (b) either the row select signal rsel(m) or the acknowledge signal col_ack(n) are deasserted after both the row select signal rsel(m) and the acknowledge signal col_ack(n) were asserted together. The rate at which the capacitor 459 is discharged via the eighth transistor 458 (a) is dependent upon the programmable bias voltage applied to the gate of the eighth transistor 458 and (b) is negatively correlated with a length of the refractory period during which the reset signal RST is held asserted after the eighth transistor 458 begins discharging the capacitor 459. For example, higher bias voltages can be used for faster discharging of the capacitor 459 via the eighth transistor 458 and therefore for shorter refractory periods. Continuing with this example, lower bias voltages can be used for slower discharging of the capacitor 459 via the eighth transistor 458 and therefore for longer refractory periods.

It is appreciated that the reset control circuit 210 of FIG. 2 may have another schematic configuration in other embodiments of the present technology than the schematic configurations shown in FIGS. 2, 3, and 4, and that the other schematic can selectively reset the event driven pixel 220 based on the row select signal rsel(m), the acknowledge signal col_ack(n), and/or the global reset signal GRST. For example, as discussed above, the delay element 343 of the reset control circuit 310 of FIG. 3 can be omitted in some embodiments of the present technology such that there is not a refractory period after the global reset signal GRST, the acknowledge signal col_ack(n), and/or the row select signal rsel(m) are deasserted. As another example, in some embodiments, the reset control circuit 410 of FIG. 4 can lack a refractory period after the global reset signal GRST, the acknowledge signal col_ack(n), and/or the row select signal rsel(m) are deasserted. As a specific example, the capacitor 459 and/or the eighth transistor 458 of the reset control circuit 410 can be omitted, and/or the bias voltage applied to the gate of the eighth transistor 458 can be set such that the capacitor 459 is quickly (e.g., immediately) discharged. It is further appreciated that the difference circuit 206, the event driven pixel 220, the threshold comparison circuit 208, and/or the control circuit 215 may have other schematic configurations in other embodiments than the schematic configurations shown in FIG. 2. Indeed, an example of an alternative schematic configuration of the present technology that can be used in addition to or in lieu of the difference circuit 206 and/or the event driven pixel 220 of FIG. 2 is discussed in detail below with respect to FIG. 6.

Figure 5:
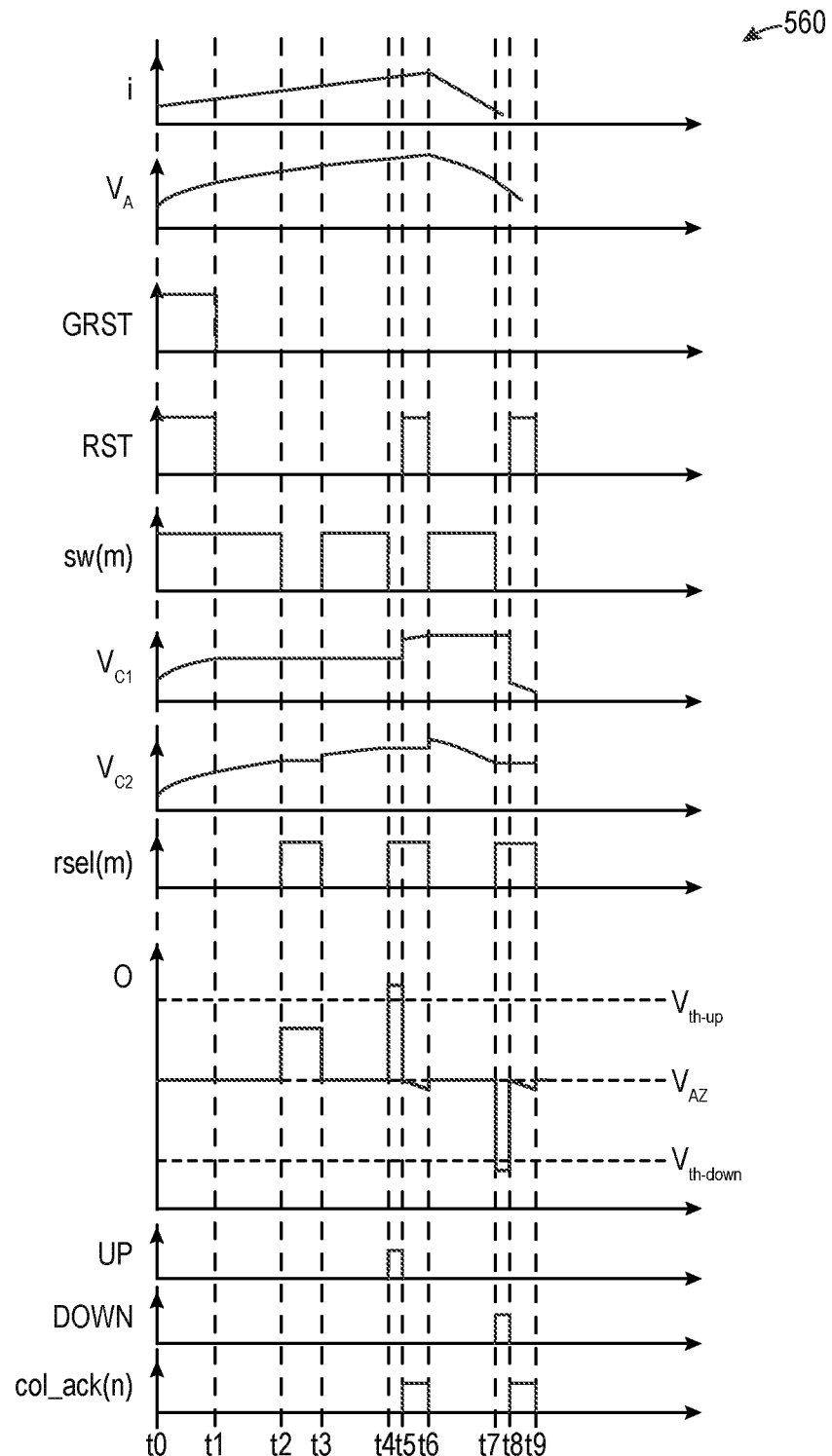
FIG. 5 is a timing diagram illustrating a method of operating an event driven pixel in accordance with various embodiments of the present technology.

FIG. 5 is a timing diagram 560 illustrating a method of operating the imaging system 200 and the event driven pixel 220 of FIG. 2 in accordance with various embodiments of the present technology. Referring to FIGS. 2 and 5 together, photocurrent generated by the photosensor 202 is assumed to be linear (as shown in the top plot in FIG. 5) for the sake of clarity and understanding. It is also assumed that the photocurrent-to-voltage converter 204 converts the photocurrent generated by the photosensor 202 into a logarithmically increasing voltage $V_A$ (as shown in the second plot from the top of FIG. 5). In other embodiments, the voltage $V_A$ produced by the photocurrent-to-voltage converter 204 can be another function (e.g., linear, square-root, etc.) of the photocurrent generated by the photosensor 202.

At time t0 shown in FIG. 5, the control circuit 215 of the imaging system 200 implements a global reset by asserting the global reset signal GRST to initialize the event driven pixel 220. When the global reset signal GRST is asserted, the reset control circuit 210 of the event driven pixel 220 asserts the reset signal RST applied to the gate of the first transistor 221. In turn, the first transistor 221 is turned on, and the voltage $V_A$ output from the photocurrent-to-voltage converter 204 is sampled onto the first capacitor 223 as a reference light level $V_{C1}$. At the same time, the control circuit 215 asserts the switch signal sw(m), thereby activating the second transistor 222 and sampling the voltage $V_A$ output from the photocurrent-to-voltage converter 204 onto the second capacitor 224 as a light level $V_{C2}$.

At time t1, the control circuit 215 deasserts the global reset signal GRST. In turn, the reset control circuit 210 deasserts the reset signal RST. Thus, at time t1, the reference light level $V_{C1}$ on the first capacitor 223 is frozen at a value equivalent to the voltage $V_A$ at time t1 (e.g., $V_A$(t1)) and can remain at that voltage level until the difference circuit 206 of the event driven pixel 220 is reset (e.g., at time t5). The control circuit 215 leaves the switch signal sw(m) asserted such that the light level $V_{C2}$ continues to track the voltage $V_A$ output from the photocurrent-to-voltage converter 204.

At time t2, the control circuit 215 deasserts the switch signal sw(m) and asserts the row select signal rsel(m) (e.g., as part of a readout scan to locate pixels of the imaging system 200 that have detected events). When the row select signal rsel(m) is asserted, the first row select transistor 227 and the second row select transistor 228 are activated. Thus, an analog light level $V_{O1}$ corresponding to the reference light level $V_{C1}$ is read out onto the first column line 207a, and an analog light level $V_{O2}$ corresponding to the momentary light level $V_{C2}$ at time t2 is read out onto the second column line 207b. The momentary light level $V_{C2}$ at time t2 is equivalent to the voltage $V_A$ at time t2 (e.g., $V_A$(t2)). As discussed above, the analog light level $V_{O1}$ and the analog light level $V_{O2}$ are complementary signals of a differential difference signal.

The analog light level $V_{O1}$ and the analog light level $V_{O2}$ are fed into corresponding inputs of the amplifier 231 of the threshold comparison circuit 208. As discussed above, the amplifier 231 may be an analog difference amplifier or a differential ADC. In the case that the amplifier 231 is an analog difference amplifier, the amplifier 231 can be autozeroed to reduce offset variability (e.g., before receiving the analog light level $V_{O1}$ and the analog light level $V_{O2}$). The amplifier 231 outputs a signal at node O that is representative of a difference between the analog light level $V_{O1}$ and the analog light level $V_{O2}$. In some embodiments, the output of the amplifier 231 at node O can be equivalent to a sum of (a) an auto-zero voltage $V_{AZ}$ of the amplifier 231 and (b) a difference in voltage between the analog light level $V_{O1}$ and the analog light level $V_{O2}$ with a gain or attenuation provided by the amplifier 231. For example, the signal at node O can be calculated using Equation 1 below:

$$O = V_{AZ} + G*\Delta V \qquad \text{Equation 1}$$

The output of the amplifier 231 appears at node O and is fed into the first and second comparators 232 and 233 of the threshold comparison circuit 208. The first comparator 232 compares the output of the amplifier 231 to a first threshold voltage $V_{th\text{-}up}$, and the second comparator 233 compares the output of the amplifier 231 to a second threshold voltage $V_{th\text{-}down}$. As shown in FIG. 5, the output of the amplifier 231 that appears at node O between time t2 and time t3 does not exceed the first threshold voltage $V_{th\text{-}up}$ or the second threshold voltage $V_{th\text{-}down}$. Thus, the output of the amplifier 231 between time t2 and time t3 will not trigger the first comparator 232 or the second comparator 233. As such, both the signal UP and the signal DOWN remain unasserted during this time period. Thus, the control circuit 215 does not register an event based on the differential difference signal read out of the event driven pixel 220 at time t2, and the acknowledge signal col_ack(n) remains unasserted. Because the acknowledge signal col_ack(n) remains unasserted, the reset control circuit 210 of the event driven pixel 220 does not reset the difference circuit 206 (e.g., absent an intervening assertion of the global reset signal GRST). Thus, the reference light level $V_{C1}$ on the first capacitor 223 remains frozen and equivalent to the voltage $V_A$ at time t1 (e.g., $V_A$(t1)).

At time t3, the control circuit 215 deasserts the row select signal rsel(m) and asserts the switch signal sw(m) to activate the second transistor 222. The switch signal sw(m) remains asserted from time t3 to time t4, meaning that the second transistor 222 remains activated from time t3 to time t4. Thus, the light level $V_{C2}$ tracks the voltage $V_A$ output from the photocurrent-to-voltage converter 204 during this time period.

At time t4, the control circuit 215 deasserts the switch signal sw(m) and asserts the row select signal rsel(m) (e.g., as part of a readout scan to locate pixels of the imaging system 200 that have detected events). When the row select signal rsel(m) is asserted, the first row select transistor 227 and the second row select transistor 228 are activated. Thus, an analog light level VO1 corresponding to the reference light level VC1 is read out onto the first column line 207a, and an analog light level VO2 corresponding to the momentary light level VC2 at time t4 is read out onto the second column line 207b. The momentary light level VC2 at time t4 is equivalent to the voltage VA at time t4 (e.g., VA (t4)). As discussed above, the analog light level VO1 and the analog light level VO2 are complementary signals of a differential difference signal.

The analog light level $V_{O1}$ and the analog light level $V_{O2}$ are fed into corresponding inputs of the amplifier 231 of the threshold comparison circuit 208. In the case that the amplifier 231 is an analog difference amplifier, the amplifier 231 can be autozeroed to reduce offset variability (e.g., before receiving the analog light level $V_{O1}$ and the analog light level $V_{O2}$). The amplifier 231 outputs a signal at node O that is representative of a difference between the analog light level $V_{O1}$ and the analog light level $V_{O2}$. The output of the amplifier 231 at node O is fed into the first and second comparators 232 and 233. The first comparator 232 compares the output of the amplifier 231 to the first threshold voltage $V_{th\text{-}up}$, and the second comparator 233 compares the output of the amplifier 231 to the second threshold voltage $V_{th\text{-}down}$. As shown in FIG. 5, the output of the amplifier 231 that appears at node O between time t4 and time t5 exceeds the first threshold voltage $V_{th\text{-}up}$ and does not exceed the second threshold voltage $V_{th\text{-}down}$. Thus, the output of the amplifier 231 triggers the first comparator 232 and does not trigger the second comparator 233. As such, the first comparator 232 asserts the signal UP while the signal DOWN output from the second comparator 233 remains unasserted.

At time t5, in response to assertion of the signal UP, the control circuit 215 registers an event and asserts the acknowledge signal col_ack(n). Because both the acknowledge signal col_ack(n) and the row select signal rsel(m) are asserted between time t5 and time t6, the reset control circuit 210 implements a local reset of the event driven pixel 220 by asserting the reset signal RST between time t5 and time t6. In turn, the asserted reset signal RST is applied to the gate of the first transistor 221, and the difference circuit 206 of the event driven pixel 220 is reset. More specifically, a new reference light voltage $V_{C1}$ is sampled onto the first capacitor 223 that corresponds to the voltage $V_A$ output from the photocurrent-to-voltage converter 204.

At time t6, the control circuit 215 deasserts the row select signal rsel(m) and the acknowledge signal col_ack(n). In turn, the reset control circuit 210 deasserts the reset signal RST. Thus, at time t6, the reference light level $V_{C1}$ on the first capacitor 223 is frozen at a value equivalent to the voltage $V_A$ at time t6 (e.g., $V_A$(t6)) and can remain at that voltage level until the difference circuit 206 of the event driven pixel 220 is again reset (e.g., at time t8). The control circuit 215 also asserts the switch signal sw(m) at time t6 to activate the second transistor 222 such that a new light level $V_{C2}$ is sampled on the second capacitor 224 that tracks the voltage $V_A$ output from the photocurrent-to-voltage converter 204. The switch signal sw(m) is left asserted until time t7. Thus, the light level $V_{C2}$ tracks the voltage $V_A$ output from the photocurrent-to-voltage converter 204 between time t6 and time t7. As shown in FIG. 5, the photocurrent output by the photosensor 202 and the voltage $V_A$ output by the photocurrent-to-voltage converter 204 decrease between time t6 and time t7. Because the light level $V_{C2}$ tracks the voltage $V_A$ output from the photocurrent-to-voltage converter 204, the light level $V_{C2}$ also decreases between time t6 and time t7.

At time t7, the control circuit 215 deasserts the switch signal sw(m) and asserts the row select signal rsel(m) (e.g., as part of a readout scan to locate pixels of the imaging system 200 that have detected events). When the row select signal rsel(m) is asserted, the first row select transistor 227 and the second row select transistor 228 are activated. Thus, an analog light level $V_{O1}$ corresponding to the reference light level $V_{C1}$ is read out onto the first column line 207a, and an analog light level $V_{O2}$ corresponding to the momentary light level $V_{C2}$ at time t7 is read out onto the second column line 207b. The momentary light level $V_{C2}$ at time t7 is equivalent to the voltage $V_A$ at time t7 (e.g., $V_A(t7)$). As discussed above, the analog light level $V_{O1}$ and the analog light level $V_{O2}$ are complementary signals of a differential difference signal.

The analog light level $V_{O1}$ and the analog light level $V_{O2}$ are fed into corresponding inputs of the amplifier 231 of the threshold comparison circuit 208. In the case that the amplifier 231 is an analog difference amplifier, the amplifier 231 can be autozeroed to reduce offset variability (e.g., before receiving the analog light level $V_{O1}$ and the analog light level $V_{O2}$). The amplifier 231 outputs a signal at node O that is representative of a difference between the analog light level $V_{O1}$ and the analog light level $V_{O2}$. The output of the amplifier 231 at node O is fed into the first and second comparators 232 and 233. The first comparator 232 compares the output of the amplifier 231 to the first threshold voltage $V_{th-up}$, and the second comparator 233 compares the output of the amplifier 231 to the second threshold voltage $V_{th-down}$. As shown in FIG. 5, the output of the amplifier 231 that appears at node O between time t7 and time t8 exceeds the second threshold voltage $V_{th-down}$ and does not exceed the first threshold voltage $V_{th-up}$. Thus, the output of the amplifier 231 triggers the second comparator 233 and does not trigger the first comparator 232. As such, the second comparator 233 asserts the signal DOWN while the signal UP output from the first comparator 232 remains unasserted.

At time t8, in response to assertion of the signal DOWN, the control circuit 215 registers an event and asserts the acknowledge signal col_ack(n). Because both the acknowledge signal col_ack(n) and the row select signal rsel(m) are asserted between time t8 and time t9, the reset control circuit 210 implements a local reset of the event driven pixel 220 by asserting the reset signal RST between time t8 and time t9. In turn, the asserted reset signal RST is applied to the gate of the first transistor 221, and the difference circuit 206 of the event driven pixel 220 is reset. More specifically, a new reference light voltage $V_{C1}$ is sampled onto the first capacitor 223 that corresponds to the voltage $V_A$ output from the photocurrent-to-voltage converter 204.

At time t9, the control circuit 215 deasserts the row select signal rsel(m) and the acknowledge signal col_ack(n). In turn, the reset control circuit 210 deasserts the reset signal RST. Thus, at time t9, the reference light level $V_{C1}$ on the first capacitor 223 is frozen at a value equivalent to the voltage $V_A$ at time t9 (e.g., $V_A(t9)$) and can remain at that voltage level until the difference circuit 206 of the event driven pixel 220 is again reset.

With continuing reference to FIGS. 2 and 5 as discussed above, asserting the switch signal sw(m) samples a light level $V_{C2}$ onto the second capacitor 224; deasserting the switch signal sw(m) holds the light level $V_{C2}$ at a last sampled value; and asserting the row select signal rsel(m) results in (a) complementary analog light levels $V_{O1}$ and $V_{O2}$ of a differential difference signal being read into the amplifier 231 and (b) an output of the amplifier 231 being fed into the first and second comparators 232 and 233. As also discussed above, when the output of the amplifier 231 triggers the first comparator 232 or the second comparator 233 of the threshold comparison circuit 208, the control circuit 215 registers an event and asserts the acknowledge signal col_ack(n) that, in turn, leads to the reset control circuit 210 asserting the reset signal RST because the acknowledge signal col_ack(n) is asserted while the row select signal rsel(m) is also asserted. When the reset signal RST is asserted, the reference light level $V_{C1}$ is updated and tracks the voltage $V_A$ output from the photocurrent-to-voltage converter 204. Because the row select signal rsel(m) remains asserted during this time period, complementary signals $V_{O1}$ and $V_{O2}$ of a differential difference signal are continually read into threshold comparison circuit 208 even (a) after the control circuit 215 registers an event and (b) while the reference light level $V_{C1}$ is permitted to move with the voltage $V_A$ (e.g., via assertion of the reset signal RST). Thus, depending on a change in the voltage $V_A$ during the time period that the reset signal RST is asserted, a corresponding change of the reference light level $V_{C1}$ can cause triggering of the first comparator 232 and/or the second comparator 233 of the threshold comparison circuit 208 beyond the initial triggering that led to the control circuit 215 asserting the acknowledge signal col_ack(n). As such, in some embodiments, the control circuit 215 can be configured to ignore the additional triggerings of the first comparator 232 and/or the second comparator 233 while the reset signal RST remains asserted after the control circuit 215 asserts the acknowledge signal col_ack(n).

In these and other embodiments, the imaging system 200 can include additional pixel logic to prevent additional triggerings of the first comparator 232 and/or the second comparator 233 of the threshold comparison circuit 208 during the time period that both the reset signal RST and the row select signal rsel(m) are asserted following assertion of the acknowledge signal col_ack(n) in response to detection of an event. For example, the imaging system 200 can include additional pixel logic that asserts the switch signal sw(m) whenever the reset signal RST is asserted, in addition to the times the switch signal sw(m) is shown asserted in FIG. 5. Thus, referring to FIG. 5 as an example, the additional pixel logic can ensure that the switch signal sw(m) is asserted (a) between time t0 and time t2, (b) between time t3 and time t4, (c) between time t5 and time t7, and (d) between time t8 and t9. Asserting the switch signal sw(m) at times that the reset signal RST is asserted permits the light level $V_{C2}$ sampled onto the second capacitor 224 to track the voltage $V_A$ output from the photocurrent-to-voltage converter 204 while the reference light level $V_{C1}$ sampled onto the first capacitor 223 is permitted to track the voltage $V_A$. In other words, the light level $V_{C2}$ is permitted to move with the reference light level $V_{C1}$, thereby eliminating any difference between the complementary analog light levels $V_{O1}$ and $V_{O2}$ of differential difference signals read into the threshold comparison circuit 208 while the row select signal rsel(m) remains asserted following detection of an event. Therefore, additional triggerings of the first comparator 232 and the second comparator 233 are prevented following detection of the event for as long as the reset signal RST remains asserted.

FIG. 6 is a partial schematic diagram of another event driven pixel 620 configured in accordance with various embodiments of the present technology. As shown, the event driven pixel 620 is similar to the event driven pixel 220 of FIG. 2. For example, the event driven pixel 620 includes (a) a photosensor 602, (b) a photocurrent-to-voltage converter 604, and (c) a difference circuit 606 having a first branch (including a first transistor 621, a first capacitor 623 having a first capacitance C1, a first source follower buffer or transistor 625, and a first row select transistor 627) and a second branch (including a second transistor 622, a second capacitor 624 having a second capacitance C2, a second source follower buffer or transistor 626, and a second row select transistor 628). Although not shown in FIG. 6, the event driven pixel 620 can further include a reset control circuit that is similar to the reset control circuit 210 of FIG. 2 and that has an output coupled to a gate of the first transistor 621. The photosensor 602, the photocurrent-to-voltage converter 604, the difference circuit 606, and the reset control circuit of the event driven pixel 620 can operate similar to the photosensor 202, the photocurrent-to-voltage converter 204, the difference circuit 206, and the reset control circuit 210, respectively, of FIG. 2. Therefore, a detailed discussion of these components of the event driven pixel 620 is omitted here for the sake of brevity.

In contrast to the event driven pixel 220 of FIG. 2, the event driven pixel 620 of FIG. 6 further includes a passive MOS varactor 670 (e.g., a varicap). The varactor 670 includes a first transistor 671 and a second transistor 672. The first capacitor 623 and the second capacitor 624 are coupled, in parallel to one another, between the output of the photocurrent-to-voltage converter 604 and the first and second transistors 671 and 672 of the varactor 670. The first transistor 671 is electrically coupled between a reference voltage $V_{REF2}$ (e.g., ground, a negative power supply rail, or another low reference potential) and the first and second capacitors 623 and 624, and the second transistor 672 is electrically coupled between a reference voltage $V_{REF3}$ (e.g., $V_{DD}$, a positive power supply rail, or another high reference voltage) and the first and second capacitors 623 and 624. The first transistor 671 includes a gate configured to receive a sample and hold signal S&H, and the second transistor 672 includes a gate configured to receive a signal Boost. As described in greater detail below, the varactor 670 can be employed in the event driven pixel 620 to provide signal amplification and reduce noise.

Characteristics of the varactor 670 will now explained with reference to FIGS. 7A and 7B. FIG. 7A is a partial, simplified schematic diagram of a MOS varactor circuit 780 configured in accordance with various embodiments of the present technology, and FIG. 7B is a timing diagram 785 illustrating a method of operating the MOS varactor circuit 780 of FIG. 7A. The MOS varactor circuit 780 can generally correspond to a portion of the event driven pixel 620 illustrated in FIG. 6. For example, the MOS varactor circuit 780 of FIG. 7A can generally correspond to the first transistor 621, the second transistor 622, the first capacitor 623, the second capacitor 624, the first transistor 671, and/or the second transistor 672 of the event driven pixel 620. Thus, for the sake of clarity and understanding, similar reference numbers and signals are used in FIGS. 7A and 7B as those used in FIG. 6.

As shown, the MOS varactor circuit 780 includes a switch 721 controlled by a reset signal RST, a switch 771 controlled by a sample and hold signal S&H, a switch 772 controlled by a signal Boost, and a MOS capacitor 723 having a drain terminal and a source terminal coupled to one another. The switch 721 selectively couples the gate of the MOS capacitor 723 to a reference voltage $V_{REF1}$. Similarly, the switch 771 selectively couples the source and drain terminals of the MOS capacitor 723 to the reference voltage $V_{REF2}$, and the switch 772 selectively couples the source and drain terminals of the MOS capacitor 723 to the reference voltage $V_{REF3}$. The switch 771 and the switch 772 can form at least part of a varactor 770.

Referring to FIGS. 7A and 7B together, when (i) the reset signal RST and the sample and hold signal S&H are both asserted and (ii) the signal Boost remains unasserted, the MOS varactor circuit 780 operates under a first phase of operation (e.g., a track or inversion phase) and a signal is sampled onto the MOS capacitor 723. More specifically, the drain and source terminals of the MOS capacitor 723 are biased to the reference voltage $V_{REF2}$ via the switch 771. Assuming (a) that the reference voltage $V_{REF2}$ is a low reference potential (e.g., ground, a negative power supply rail, or another reference voltage lower than the reference voltage $V_{REF1}$) and (b) that the reference voltage $V_{REF1}$ is large enough to cause channel inversion by pulling charges from the drain and source terminals of the MOS capacitor 723 to form a channel, the capacitance of the MOS capacitor 723 can be defined by the gate-oxide capacitances because the junction capacitance is at the reference voltage $V_{REF2}$.

On the other hand, when (i) the signal Boost is asserted and (ii) the reset signal RST and the sample and hold signal S&H are unasserted, the MOS varactor circuit 780 operates under a second phase of operation (e.g., an amplification or accumulation phase) and the voltage at node G is increased. More specifically, the drain and source terminals of the MOS capacitor 723 are biased to the reference voltage $V_{REF3}$. Assuming that the reference voltage $V_{REF3}$ is a high reference potential (e.g., $V_{DD}$, a positive power supply rail, or another reference voltage higher than the reference voltage $V_{REF1}$ and/or $V_{REF2}$), channel inversion charge will be removed. In addition, although charge at the gate (node G) of the MOS capacitor 723 will not change when the MOS varactor circuit 780 transitions into the second phase of operation, the capacitance seen by the gate (node G) of the MOS capacitor 723 is a series connection of the gate capacitance and the diffusion capacitance in the bulk of the semiconductor that is biased to ground or another low voltage. Because the series connection of these capacitances is smaller than the individual contribution of the gate-oxide capacitance and because the charge at the gate (node G) of the MOS capacitor 723 remains unchanged, the voltage at node G is increased to a potential given by Equations 2 and 3 below:

$$V_G = V_{REF1}(t1) * \frac{C_{oxide}}{\left(\dfrac{1}{C_{oxide}} + \dfrac{1}{C_{diffusion}}\right)}, \text{ with} \quad \text{Equation 2}$$

$$\frac{C_{oxide}}{\dfrac{1}{C_{oxide}} + \dfrac{1}{C_{diffusion}}} > 1 \quad \text{Equation 3}$$

The discussion of the MOS varactor circuit 780 above neglects fringe capacitance at the junction of the source and drain terminals of the MOS capacitor 723, which should be kept minimal. A three-terminal device, such as the three-terminal device 881 illustrated in FIG. 8, can be used in some embodiments of the present technology to reduce, minimize, or eliminate fringe capacitance at the junction of the source and drain terminals.

Referring again to FIG. 6 in light of the discussion of FIGS. 7A-8 above, when the reset signal RST is asserted, the first transistor 621 is activated and a reference light level $V_{C1}$ corresponding to a voltage $V_A$ output from the photocurrent-to-voltage converter 204 is sampled onto the second capacitor 624. During the sampling of the reference light level $V_{C1}$, the sample and hold signal S&H applied to the gate of the first transistor 671 of the varactor 670 can be asserted such that the bottom plates of the first and second capacitors 623 and 624 are biased to the reference voltage $V_{REF2}$ (e.g., ground, a negative power supply rail, or another low reference potential) via the first transistor 671. As discussed above, when the switch signal sw(m) is asserted, the second transistor 622 is activated, and a light level $V_{C2}$ corresponding to the voltage $V_A$ output by the photocurrent-to-voltage converter 604 is continuously sampled onto the second capacitor 624 for as long as the switch signal sw(m) remains asserted. During the sampling of the light level $V_{C2}$, the sample and hold signal S&H applied to the gate of the first transistor 671 can again be asserted such that the bottom plates of the first and second capacitors 623 and 624 are biased to the reference voltage $V_{REF2}$ via the first transistor 671. After sampling the light level $V_{C2}$ onto the second capacitor 624, the switch signal sw(m) and the sample and hold signal S&H can be deasserted. In a non-overlapping manner, the signal Boost applied to the gate of the second transistor 672 of the varactor 670 can then be asserted to pull out inversion change from the channels formed on the first and second capacitors 623 and 624. In turn, the capacitance of the first and second capacitors 623 and 624 seen by the gates of the first and second source follower transistors 625 and 626 decreases, resulting in passive amplification of the reference light level $V_{C1}$ and of the light level $V_{C2}$. Complementary analog light levels corresponding to the amplified reference light level $V_{C1}$ and the amplified light level $V_{C2}$ can then be read out of the event driven pixel 620 and compared to detect whether an event has occurred in an external scene, consistent with the discussion of FIGS. 2 and 5 above. In this manner, the event driven pixel 620 can employ the varactor 670 to provide passive signal amplification and a reduction in noise by cycling the varactor 670 through inversion and accumulation phases.

FIGS. 9-12 are partial schematic diagrams of photocurrent-to-voltage converters 904, 1004, 1104, and 1204, respectively, configured in accordance with various embodiments of the present technology. The photocurrent-to-voltage converters 904, 1004, 1104, and 1204 can each be used in the event driven pixel 220 of FIG. 2 to convert photocurrent to a voltage and are therefore illustrated as being coupled to the photosensor 202 of FIG. 2. Each of the photocurrent-to-voltage converters 904, 1004, 1104, and 1204 can be used in other event driven pixels of the present technology, including the event driven pixel 620 of FIG. 6. Therefore, each of the photocurrent-to-voltage converters 904, 1004, 1104, and 1204 can be coupled to the photosensor 602 or another photosensor of the present technology.

Figure 9:
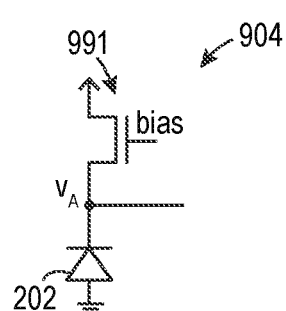
FIGS. 9-12 are partial schematic diagrams of photocurrent-to-voltage converters coupled to photosensors, each configured in accordance with various embodiments of the present technology.

Referring first to FIG. 9, the photocurrent-to-voltage converter 904 includes a transistor 991 having (a) a source coupled to the cathode of the photosensor 202 and (b) a drain coupled to a supply voltage (e.g., a positive power supply rail or another reference voltage). A gate of the transistor 991 is coupled to a bias voltage. In operation, the photocurrent-to-voltage converters 904 is configured to convert photocurrent output by the photosensor 202 to a voltage $V_A$, which can be fed to a difference circuit (e.g., the difference circuit 206 of FIG. 2, the difference circuit 606 of FIG. 6, and/or another difference circuit of the present technology), as discussed above. More specifically, the photocurrent-to-voltage converter 904 is configured to generate a voltage $V_A$ that has a logarithmic or other (e.g., linear, square-root, etc.) relation with the intensity of incident light received by the photosensor 202 from an external scene.

Figure 10:
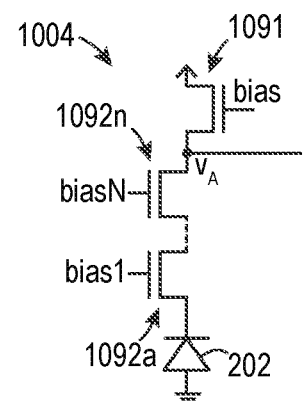

Referring now to FIG. 10, the photocurrent-to-voltage converter 1004 includes a transistor 1091 having (a) a drain coupled to a supply voltage (e.g., a positive power supply rail or another reference voltage) and (b) a gate coupled to a bias voltage. The photocurrent-to-voltage converter 1004 further includes a plurality of transistors 1092 (identified individually in FIG. 10 as first through nth transistors 1092a-1092n) that are stacked in series with one another. The first transistor 1092a of the plurality includes a source coupled to the cathode of the photosensor 202, and the nth transistor 1092n of the plurality includes a drain coupled to a source of the transistor 1091 and to an output of the photocurrent-to-voltage converter 1004 at which the photocurrent-to-voltage converter 1004 generates a voltage $V_A$.

As shown, each of the first through nth transistors 1092a-1092n include a gate configured to receive a corresponding bias voltage. The bias voltages applied to the gates of the first through nth transistors 1092a-1092n can be identical, or at least some of the bias voltages can vary from one another. The bias voltages applied to the gates of the first through nth transistors 1092a-1092n can operate the first through nth transistors 1092a-1092n in weak inversion such that the first through nth transistors 1092a-1092n provide signal amplification. In other words, the first through nth transistors 1092a-1092n can be employed to amplify the voltage VA produced at the output (node A) of the photocurrent-to-voltage converter 1004.

Figure 11:
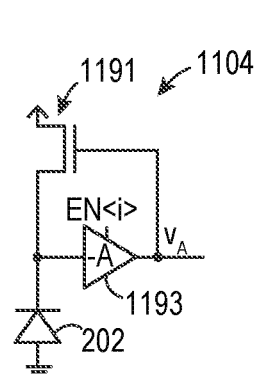

Referring now to FIG. 11, the photocurrent-to-voltage converter 1104 includes a transistor 1191 having (a) a source coupled to the cathode of the photosensor 202 and (b) a drain coupled to a supply voltage (e.g., a positive power supply rail or another reference voltage). The photocurrent-to-voltage converter 1104 further includes an amplifier 1193 having (a) an input (e.g., an inverting input) coupled to the cathode of the photosensor 202 and to the source of the transistor 1191, and (b) an output coupled (i) to an output of the photocurrent-to-voltage converter 1104 at which the photocurrent-to-voltage converter 1104 generates a voltage $V_A$ and (ii) to a gate of the transistor 1191. In some embodiments, the amplifier 1193 can be an opamp and/or can include another input (not shown), such as a non-inverting input, that is coupled to ground (e.g., a negative power supply rail or another reference voltage).

The amplifier 1193 can be employed to increase the response speed of a change of the voltage $V_A$ generated at the output of the photocurrent-to-voltage converter 1104 between the source and the gate of the transistor 1191. In other words, the amplifier 1193 can be employed in low-latency applications to increase the speed with which a difference circuit (e.g., the difference circuit 206 of FIG. 2, the difference circuit 606 of FIG. 6, or another difference circuit of the present technology) produces a differential difference signal based on the voltage $V_A$.

As shown in FIG. 11, the amplifier 1193 can be configured to receive an enable signal EN<i>. The enable signal EN<i> can be used to selectively enable or disable the amplifier 1193. For example, the enable signal EN<i> can be used to selectively disable or place the amplifier 1193 in a powered-down mode (thereby reducing power consumption of the corresponding event driven pixel) at times when the corresponding event driven pixel is not sampling a reference signal or outputting a differential difference signal, and can selectively enable or place the amplifier 1193 in a powered-up mode at times when the corresponding event driven pixel is sampling a reference signal or is expected to output a differential difference signal onto the column lines (e.g., when the row select signal rsel(m) is asserted). In some embodiments, the amplifier 1193 may require time to settle. In these embodiments, the enable signal EN<i> can be asserted a given time before a differential difference signal is readout from the corresponding event driven pixel onto the column lines.

Figure 12:
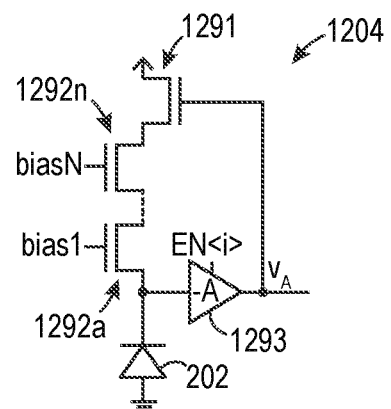

Referring now to FIG. 12, the photocurrent-to-voltage converter 1204 represents a combination of the photocurrent-to-voltage converter 1004 of FIG. 10 and the photocurrent-to-voltage converter 1104 of FIG. 11. More specifically, the photocurrent-to-voltage converter 1204 includes a transistor 1291, a plurality of transistors 1292 (identified individually in FIG. 12 as first through nth transistors 1292a-1292n), and an amplifier 1293. The plurality of transistors 1292 are stacked in series with one another. The first transistor 1292a of the plurality includes a source coupled to the cathode of the photosensor 202 and to an input (e.g., an inverting input) of the amplifier 1293. The nth transistor 1292n of the plurality includes a drain coupled to a source of the transistor 1291. The amplifier 1293 includes an output coupled (i) to an output of the photocurrent-to-voltage converter 1204 at which the photocurrent-to-voltage converter 1204 generates a voltage $V_A$ and (ii) to a gate of the transistor 1291. In some embodiments, the amplifier 1293 can be an opamp and/or can include another input (not shown), such as a non-inverting input, that is coupled to ground (e.g., a negative power supply rail or another reference voltage). The transistor 1291 includes a drain coupled to a supply voltage (e.g., a positive power supply rail or another reference voltage).

Similar to the first through nth transistors 1092a-1092n of the photocurrent-to-voltage converter 1004 of FIG. 10, each of the first through nth transistors 1292a-1292n of FIG. 12 include a gate configured to receive a corresponding bias voltage. The bias voltages applied to the gates of the first through nth transistors 1292a-1292n can be identical, or at least some of the bias voltages can vary from one another. The bias voltages applied to the gates of the first through nth transistors 1292a-1292n can operate the first through nth transistors 1292a-1292n in weak inversion such that the first through nth transistors 1292a-1292n provide signal amplification, as discussed above.

Similar to the amplifier 1193 of the photocurrent-to-voltage converter 1104 of FIG. 11, the amplifier 1293 can be employed to increase the response speed of a change of the voltage $V_A$ generated at the output of the photocurrent-to-voltage converters 1204 between the source and the gate of the transistor 1191. In other words, the amplifier 1293 can be employed in low-latency applications to increase the speed with which a difference circuit (e.g., the difference circuit 206 of FIG. 2, the difference circuit 606 of FIG. 6, or another difference circuit of the present technology) of the corresponding event driven pixel produces a differential difference signal based on the voltage $V_A$. Additionally, or alternatively, the amplifier 1293 can be configured to receive the enable signal EN<i> consistent with the discussion of the amplifier 1193 of the photocurrent-to-voltage converter 1104 of FIG. 11 above, to selectively enable or disable the amplifier 1293 (e.g., to reduce power consumption of the photocurrent-to-voltage converter 1204 and therefore of the corresponding event driven pixel).

C. Conclusion

The above detailed descriptions of embodiments of the technology are not intended to be exhaustive or to limit the technology to the precise form disclosed above. Although specific embodiments of, and examples for, the technology are described above for illustrative purposes, various equivalent modifications are possible within the scope of the technology as those skilled in the relevant art will recognize. For example, although steps are presented in a given order above, alternative embodiments may perform steps in a different order. Furthermore, the various embodiments described herein may also be combined to provide further embodiments.

From the foregoing, it will be appreciated that specific embodiments of the technology have been described herein for purposes of illustration, but well-known structures and functions have not been shown or described in detail to avoid unnecessarily obscuring the description of the embodiments of the technology. Where context permits, singular or plural terms may also include the plural or singular term, respectively. In addition, unless the word "or" is expressly limited to mean only a single item exclusive from the other items in reference to a list of two or more items, then the use of "or" in such a list is to be interpreted as including (a) any single item in the list, (b) all of the items in the list, or (c) any combination of the items in the list. Furthermore, as used herein, the phrase "and/or" as in "A and/or B" refers to A alone, B alone, and both A and B. Additionally, the terms "comprising," "including," "having," and "with" are used throughout to mean including at least the recited feature(s) such that any greater number of the same features and/or additional types of other features are not precluded. Moreover, as used herein, the phrases "based on," "depends on," "as a result of," and "in response to" shall not be construed as a reference to a closed set of conditions. For example, an exemplary step that is described as "based on condition A" may be based on both condition A and condition B without departing from the scope of the present disclosure. In other words, as used herein, the phrase "based on" shall be construed in the same manner as the phrase "based at least in part on" or the phrase "based at least partially on." Also, the terms "connect" and "couple" are used interchangeably herein and refer to both direct and indirect connections or couplings. For example, where the context permits, element A "connected" or "coupled" to element B can refer (i) to A directly "connected" or directly "coupled" to B and/or (ii) to A indirectly "connected" or indirectly "coupled" to B.

From the foregoing, it will also be appreciated that various modifications may be made without deviating from the disclosure or the technology. For example, one of ordinary skill in the art will understand that various components of the technology can be further divided into subcomponents, or that various components and functions of the technology may be combined and integrated. In addition, certain aspects of the technology described in the context of particular embodiments may also be combined or eliminated in other embodiments. Furthermore, although advantages associated with certain embodiments of the technology have been described in the context of those embodiments, other embodiments may also exhibit such advantages, and not all embodiments need necessarily exhibit such advantages to fall within the scope of the technology. Accordingly, the disclosure and associated technology can encompass other embodiments not expressly shown or described herein.

What is claimed is:

1. An event driven pixel, comprising:
a photosensor configured to generate photocurrent in response to incident light received from an external scene;
photocurrent-to-voltage converter coupled to the photosensor to convert the photocurrent to a voltage; and
a difference circuit coupled to the photocurrent-to-voltage converter, wherein the difference circuit includes:
a first circuit branch configured (i) to sample a reference light level based at least in part on the voltage and assertion of a reset signal applied to the event driven pixel and (ii) to output a first analog light level onto a first column line, wherein the first analog light level is based at least in part on the reference light level, and
a second circuit branch configured (i) to sample a light level based at least in part on the voltage and assertion of a switch signal applied to the event driven pixel and (ii) to output a second analog light level onto a second column line, wherein the second analog light level is based at least in part on the light level,
wherein a difference between the second analog light level and the first analog light level is indicative of whether the event driven pixel has detected an event in the external scene.

2. The event driven pixel of claim 1, wherein:
the first circuit branch includes:
a row select transistor coupled to the first column line and configured to receive a row select signal at a gate of the row select transistor,
a source follower transistor coupled to the row select transistor,
a capacitor coupled to a gate of the source follower transistor, and
a transistor having a drain coupled to the photocurrent-to-voltage converter, a source coupled to the capacitor and to the gate of the source follower transistor, and a gate configured to receive the reset signal; and
the first circuit branch is configured to sample the reference light level onto the capacitor.

3. The event driven pixel of claim 2, wherein the capacitor is coupled between (a) the gate of the source follower transistor and the source of the transistor and (b) ground.

4. The event driven pixel of claim 1, wherein:
the second circuit branch includes:
a row select transistor coupled to the second column line and configured to receive a row select signal at a gate of the row select transistor,
a source follower transistor coupled to the row select transistor,
a capacitor coupled to a gate of the source follower transistor, and
a transistor having a drain coupled to the photocurrent-to-voltage converter, a source coupled to the capacitor and to the gate of the source follower transistor, and a gate configured to receive the switch signal; and
the second circuit branch is configured to sample the light level onto the capacitor.

5. The event driven pixel of claim 4, wherein the capacitor is coupled between the gate of the source follower transistor and the source of the transistor and (b) ground.

6. The event driven pixel of claim 1, wherein the switch signal is supplied to multiple event driven pixels in a row of event driven pixels including the event driven pixel.

7. The event driven pixel of claim 1, further comprising a varactor coupled to (a) a first capacitor of the first circuit branch and (b) a second capacitor of the second circuit branch.

8. The event driven pixel of claim 7, wherein the varactor includes:
a first transistor having a gate configured to receive a sample and hold signal, wherein the first transistor is coupled between (i) a first reference voltage and (ii) the first capacitor or the second capacitor; and
a second transistor having a gate configured to receive a boost signal, wherein the second transistor is coupled between (i) a second reference voltage and (ii) the first capacitor or the second capacitor.

9. The event driven pixel of claim 7, wherein the first and second capacitors are coupled, in parallel to one another, between (a) the photocurrent-to-voltage converter and (b) the varactor.

10. The event driven pixel of claim 1, further comprising a reset control circuit coupled to the difference circuit, wherein the reset control circuit is configured to:
initialize the difference circuit in response to assertion of a global reset signal applied to the reset control circuit; and
reset the difference circuit in response to a combination of (a) assertion of a row select signal applied to the reset control circuit and (b) assertion of an acknowledge signal applied to the reset control circuit when the difference between the second analog light level and the first analog light level indicates that the event driven pixel has detected the event in the external scene.

11. The event driven pixel of claim 10, wherein:
the reset control circuit includes:
an AND logic gate having a first input configured to receive the row select signal, and a second input configured to receive the acknowledge signal, and
an OR logic gate having a first input coupled to an output of the AND logic gate, a second input configured to receive the global reset signal, and an output coupled to an output of the reset control circuit; and
the output of the reset control circuit is coupled to the first branch of the difference circuit and is configured to apply the reset signal to the first branch of the difference circuit.

12. The event driven pixel of claim 10, wherein:
the reset control circuit includes:
a NAND logic gate having a first input configured to receive the row select signal, and a second input configured to receive the acknowledge signal,
at least one pass transistor coupled to an output of the NAND logic gate and configured to receive the global reset signal, and
a low-active switch configured to couple a supply voltage to an output of the reset control circuit based at least in part on the output of the NAND logic gate, an output of the at least one pass transistor, or a combination thereof, and
the output of the reset control circuit is coupled to the first branch of the difference circuit and is configured to apply the reset signal to the first branch of the difference circuit.

13. The event driven pixel of claim 1, wherein:
the photocurrent-to-voltage converter includes a transistor having a drain coupled to a supply voltage, a source coupled to the photosensor, and a gate coupled to a first bias potential; and
the photocurrent-to-voltage converter generates the voltage between the source of the transistor and the photosensor.

14. The event driven pixel of claim 13, wherein:
the photocurrent-to-voltage converter further includes a plurality of second transistors arranged in series between the photosensor and the source of the transistor;
each of the second transistors has a gate coupled to a corresponding bias potential; and
the photocurrent-to-voltage converter generates the voltage between the source of the first transistor and an end of the series of the plurality of second transistors opposite the photosensor.

15. The event driven pixel of claim 1, wherein:
the photocurrent-to-voltage converter includes:
a transistor having a source coupled to the photosensor, and a drain coupled to a supply voltage, and
an amplifier having an input coupled to the photosensor and to the source of the transistor, and an output coupled to a gate of the transistor; and
the photocurrent-to-voltage converter generates the voltage at the output of the amplifier.

16. The event driven pixel of claim 15, wherein the amplifier is configured to receive an enable signal to selectively enable the amplifier.

17. The event driven pixel of claim 15, wherein:
the photocurrent-to-voltage converter further includes a plurality of second transistors arranged in series between (a) the photosensor and the input of the amplifier and (b) the source of the transistor; and
each of the second transistors has a gate coupled to a corresponding bias potential.

18. A method of operating an event driven pixel, the method comprising:
photogenerating, photocurrent with a photosensor in response to receiving incident light from an external scene;
converting the photocurrent to a first voltage;
generating a differential difference signal based at least in part on the first voltage, wherein generating the differential difference signal includes (a) sampling a reference light level onto a first capacitor of a difference circuit of the event driven pixel, (b) generating, using a first source follower transistor of the difference circuit, a first analog light level based at least in part on the reference light level, (c) sampling a light level onto a second capacitor of the difference circuit, and (d) generating, using a second source follower transistor of the difference circuit, a second analog light level, wherein a difference between the second analog light level and the first analog light level is indicative of whether the event driven pixel has detected an event in the external scene; and
outputting the differential difference signal in response to assertion of a row select signal, wherein outputting the differential difference signal includes (i) outputting the first analog light level onto a first column line and (ii) outputting the second analog light level onto a second column line.

19. The method of claim 18, wherein sampling the reference light level onto the first capacitor includes asserting a reset signal applied to the difference circuit such that a voltage on the first capacitor tracks the first voltage.

20. The method of claim 19, further comprising asserting a switch signal applied to the difference circuit whenever the reset signal is asserted such that a voltage on the second capacitor tracks the first voltage while the voltage on the first capacitor tracks the first voltage.

21. The method of claim 18, wherein sampling the reference light level includes biasing a bottom plate of the first capacitor to a low reference potential based at least in part on assertion of a sample and hold signal S&.H applied to a varactor of the event driven pixel.

22. The method of claim 18, wherein sampling the light level onto the second capacitor includes asserting a switch signal applied to the difference circuit such that a voltage on the second capacitor tracks the first voltage.

23. The method of claim 18, wherein sampling the light level includes biasing a bottom plate of the second capacitor to a low reference potential based at least in part on assertion of a sample and hold signal S&H applied to a varactor of the event driven pixel.

24. The method of claim 18, wherein outputting the differential difference signal includes amplifying the reference light level and the light level based at least in part on assertion of a boost signal applied to a varactor of the event driven pixel, wherein amplifying the reference light level and the light level includes decreasing a capacitance of the first and second capacitors.

25. The method of claim 18, further comprising:
asserting an acknowledge signal when the difference between the second analog light level and the first analog light level exceeds a threshold; and
resetting the difference circuit in response to an overlap of (a) the assertion of the row select signal and (b) the assertion of the acknowledge signal.

26. The method of claim 25, wherein resetting the difference circuit includes:
asserting a reset signal applied to the difference circuit such that a voltage on the first capacitor tracks the first voltage; and
sampling a new reference light level on the first capacitor based at least in part on the assertion of the reset signal.

27. The method of claim 26, wherein resetting the difference circuit includes:
continually outputting the differential difference signal in response to the assertion of the row select signal; and
after asserting the acknowledge signal and until after deasserting the reset signal, ignoring results of a comparison between (a) the difference between the second analog light level and the first analog light level and (b) the threshold.

28. The method of claim 18, further comprising:
comparing the difference between the second analog light level and the first analog light level to a threshold; and
preventing a reset of the difference circuit when (a) the row select signal is asserted, (b) a global reset signal is not asserted, and (c) the difference between the second analog light level and the first analog light level does not exceed the threshold.

29. The method of claim 28, further comprising producing the difference between the second analog light level and the first analog light level at an output of an amplifier, wherein producing the difference includes autozeroing, the amplifier.

30. The method of claim 18, further comprising initializing the difference circuit, wherein initializing the difference circuit includes asserting a global reset signal applied to the event driven pixel.

31. The method of claim 18, wherein converting the photocurrent to the first voltage includes converting the photocurrent to the first voltage using a photocurrent-to-voltage converter of the event driven pixel, and wherein the method further comprises selectively disabling an amplifier of the photocurrent-to-voltage converter while photogenerating the photocurrent.

32. An imaging system, comprising:
event driven pixel including:
- a photodetector configured to generate photocurrent in response to incident light received from an external scene,
- a photocurrent-to-voltage converter coupled to the photodetector to convert the photocurrent to a voltage, and
- a difference circuit coupled to the photocurrent-to-voltage: converter, wherein the difference circuit is configured to (i) sample a reference light level onto a first capacitor, the reference light level based at least in part on the voltage, (ii) output a first analog light level onto a first column line that is based at least in part on the reference light level, (iii) sample a light level onto a second capacitor, the light level based at least in part on the voltage, and (iv) output a second analog light level onto a second column line that is based at least in part on the light level, wherein a difference between the second analog light level and the first analog light level is indicative of whether the event driven pixel has detected an event in the external scene;

a threshold comparison circuit coupled to the first and second column lines and configured to compare the difference between the second analog light level and the first analog light level to one or more thresholds; and a control circuit coupled to the threshold comparison circuit and to the event driven pixel, wherein the control circuit is configured, when the difference between the second analog light level and the first analog light level exceeds a threshold of the one or more thresholds, to (i) register that the event driven pixel has detected the event and (ii) initiate reset of the difference circuit of the event driven pixel such that a new reference light level is sampled onto the first capacitor.

33. The imaging system of claim 32, wherein:
the threshold comparison circuit includes:
- an amplifier having a first input coupled to the first column line and a second input coupled to the second column line, the amplifier configured to generate the difference between the second analog light level and the first analog light level at an output of the amplifier,
- a first comparator having an input coupled to the output of the amplifier and an output coupled to the control circuit, the first comparator configured to compare (a) the difference between the second analog light level and the first analog light level to (b) a first threshold of the one or more thresholds, and
- a second comparator having an input coupled to the output of the amplifier and an output coupled to the control circuit, the second comparator configured to compare (a) the difference between the second analog light level and the first analog light level to (b) a second threshold of the one or more thresholds; and the amplifier includes an analog difference amplifier or a differential analog-to-digital converter.

34. The imaging system of claim 32, wherein:
the event driven pixel further includes a varactor; and
the first capacitor and the second capacitor are coupled, in parallel to one another, between (a) an output of the photocurrent-to-voltage converter and (b) the varactor.

* * * * *